United States Patent
Craft et al.

(10) Patent No.: US 10,011,469 B2
(45) Date of Patent: Jul. 3, 2018

(54) ROTATABLE ENGAGEMENT OF ADDITIVE MANUFACTURING BUILD PLATE

(71) Applicant: General Electric Company, Schenectady, NY (US)

(72) Inventors: Tiffany Muller Craft, Simpsonville, SC (US); Steven John Barnell, Pelzer, SC (US); Archie Lee Swanner, Jr., Easley, SC (US); Steven Charles Woods, Easley, SC (US)

(73) Assignee: General Electric Company, Schenectady, NY (US)

(*) Notice: Subject to any disclaimer, the term of this patent is extended or adjusted under 35 U.S.C. 154(b) by 93 days.

(21) Appl. No.: 15/096,482

(22) Filed: Apr. 12, 2016

(65) Prior Publication Data
US 2017/0291804 A1    Oct. 12, 2017

(51) Int. Cl.
| B66F 11/00 | (2006.01) |
| B33Y 40/00 | (2015.01) |
| B33Y 50/00 | (2015.01) |

(52) U.S. Cl.
CPC ............... *B66F 11/00* (2013.01); *B33Y 40/00* (2014.12); *B33Y 50/00* (2014.12)

(58) Field of Classification Search
CPC ..... B25J 5/007; B25J 5/02; B25J 9/027; B25J 15/08; B25J 18/007; B25J 18/02; B25J 18/04; H01L 21/67718; B66F 11/00; B33Y 40/00
See application file for complete search history.

(56) References Cited

U.S. PATENT DOCUMENTS

| 4,507,046 | A | * | 3/1985 | Sugimoto | ................ B25J 9/046 901/15 |
| 5,037,267 | A | * | 8/1991 | Warner | ...................... B25J 5/02 414/744.6 |
| 5,606,262 | A | * | 2/1997 | Montalbano | ............. B25J 9/041 73/866.5 |
| 5,672,044 | A | * | 9/1997 | Lemelson | ............... B66C 23/00 414/744.3 |
| 6,261,077 | B1 | | 7/2001 | Bishop et al. | |
| 7,476,072 | B2 | * | 1/2009 | Tamura | .................... B25J 9/023 414/749.1 |
| 2006/0022379 | A1 | * | 2/2006 | Wicker | .................. B33Y 30/00 264/255 |
| 2007/0075460 | A1 | | 4/2007 | Wahlstrom et al. | |
| 2007/0077323 | A1 | | 4/2007 | Stonesmith et al. | |
| 2015/0221536 | A1 | * | 8/2015 | Yokoyama | ........ H01L 21/67718 414/749.1 |

FOREIGN PATENT DOCUMENTS

EP    1769901 A2    4/2007

* cited by examiner

*Primary Examiner* — Gerald McClain
(74) *Attorney, Agent, or Firm* — Ernest G. Cusick; Hoffman Warnick LLC (57) ABSTRACT

Apparatuses and systems for rotatably engaging an additive manufacturing build plate are disclosed. An apparatus may include: a height adjustable platform; a rotatable member coupled to the height adjustable platform; an alignment member coupled to a first end of the rotatable member; and first and second coupling members each extending from the first radial end of the alignment member wherein the first and second coupling members are oriented substantially parallel to the rotatable member.

14 Claims, 7 Drawing Sheets

ROTATABLE ENGAGEMENT OF ADDITIVE MANUFACTURING BUILD PLATE

BACKGROUND

The disclosure relates generally to the engagement and manipulation of additive manufacturing build plates ("build plates"). More particularly, embodiments of the present disclosure provide apparatuses and systems for providing rotatable engagement of a build plate.

The pace of change and improvement in the realms of power generation, aviation, and other fields has accompanied extensive research for manufacturing components used in these fields. Conventional manufacture of metallic components generally includes milling or cutting away regions from a slab of metal before treating and modifying the cut metal to yield a part, which may have been simulated using computer models, e.g., in drafting software. Manufactured components which may be formed from metal can include, e.g., airfoil components for installation in a turbomachine such as an aircraft engine or power generation system. The development of additive manufacturing, also known in the art as "3D printing," can reduce manufacturing costs by allowing such components to be formed more quickly, with unit-to-unit variations as appropriate, through direct application of computer-generated models and with less expensive equipment and/or raw materials.

Additive manufacturing can allow a component to be formed from a reserve of fine metal powder positioned on a build plate, which is processed by an electron beam or laser (e.g., using heat treatments such as sintering) to form a component or sub-component. Additive manufacturing equipment can also form components, e.g., by using three-dimensional models generated with software included within and/or external to the manufacturing equipment. Some devices fabricated via additive manufacture can be formed initially as several distinct components at respective processing stages before being assembled in a subsequent process. However implemented, one challenge associated with additive manufacturing includes removing several types of waste material and other remains from a build plate after forming a particular component. For example, parts formed from metallic materials may be physically connected to the build plate via a group of supports, which may need to be removed after manufacturing the finished component. These supports and similar components may be positioned in a wide variety of locations, depending on the component(s) being manufactured.

SUMMARY

A first aspect of the disclosure provides an apparatus including: a height adjustable platform; a rotatable member coupled to the height adjustable platform and defining an axial direction from the height adjustable platform; an alignment member coupled to a first end of the rotatable member and oriented radially relative to the axial direction, wherein the alignment member includes a first radial end and an opposing second radial end; a first coupling member extending in the axial direction from the first radial end of the alignment member and configured to mechanically engage a first sidewall of a plate, wherein the first coupling member is oriented substantially parallel to the rotatable member; and a second coupling member extending in the axial direction from the second end of the alignment member and configured to mechanically engage a second sidewall of the plate, the second sidewall being radially opposed to the first sidewall, wherein the second coupling member is oriented substantially parallel to the rotatable member.

A second aspect of the disclosure provides an apparatus including: a rotatable member including an actuator therein, and mechanically coupled to a height adjustable platform, wherein the rotatable member defines an axial direction; a pair of coupling members coupled to the rotatable member, wherein each of the pair of rotatable members extends axially and substantially parallel with the rotatable member; a controller operatively connected to the rotatable member and configured to rotatably engage the pair of coupling members with a build plate by performing actions including: rotating the pair of coupling members to be substantially aligned with a respective pair of opposing sidewalls of the build plate, linearly actuating the pair of coupling members to engage the pair of opposing sidewalls of the build plate, and adjusting a position of the build plate with the pair of coupling members engaged in the pair of opposing sidewalls thereof.

A third aspect of the invention provides a system including: a height adjustable platform; a rotatable member coupled to the height adjustable platform and defining an axial direction from the height adjustable platform, the rotatable member including an actuator therein; an alignment member coupled to a first end of the rotatable member and oriented radially relative to the axial direction, wherein the alignment member includes a first radial end and an opposing second radial end; a first coupling member extending axially from the first radial end of the alignment member and configured to mechanically engage a first sidewall of a build plate, wherein the first coupling member is oriented substantially parallel to the rotatable member; a second coupling member extending axially from the second end of the alignment member and configured to mechanically engage a second sidewall of the build plate, the second sidewall being radially opposed to the first sidewall, wherein the second coupling member is oriented substantially parallel to the rotatable member; and a controller communicatively coupled to the actuator of the rotatable member, wherein the controller is configured to perform actions including: rotating the rotatable member to be substantially aligned with a respective pair of opposing sidewalls of the build plate; linearly actuating the rotatable member such that the first and second coupling members engage the first and second sidewalls of the build plate; and rotating the rotatable member to move the build plate with the first and second coupling members engaged in the first and second sidewalls thereof.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
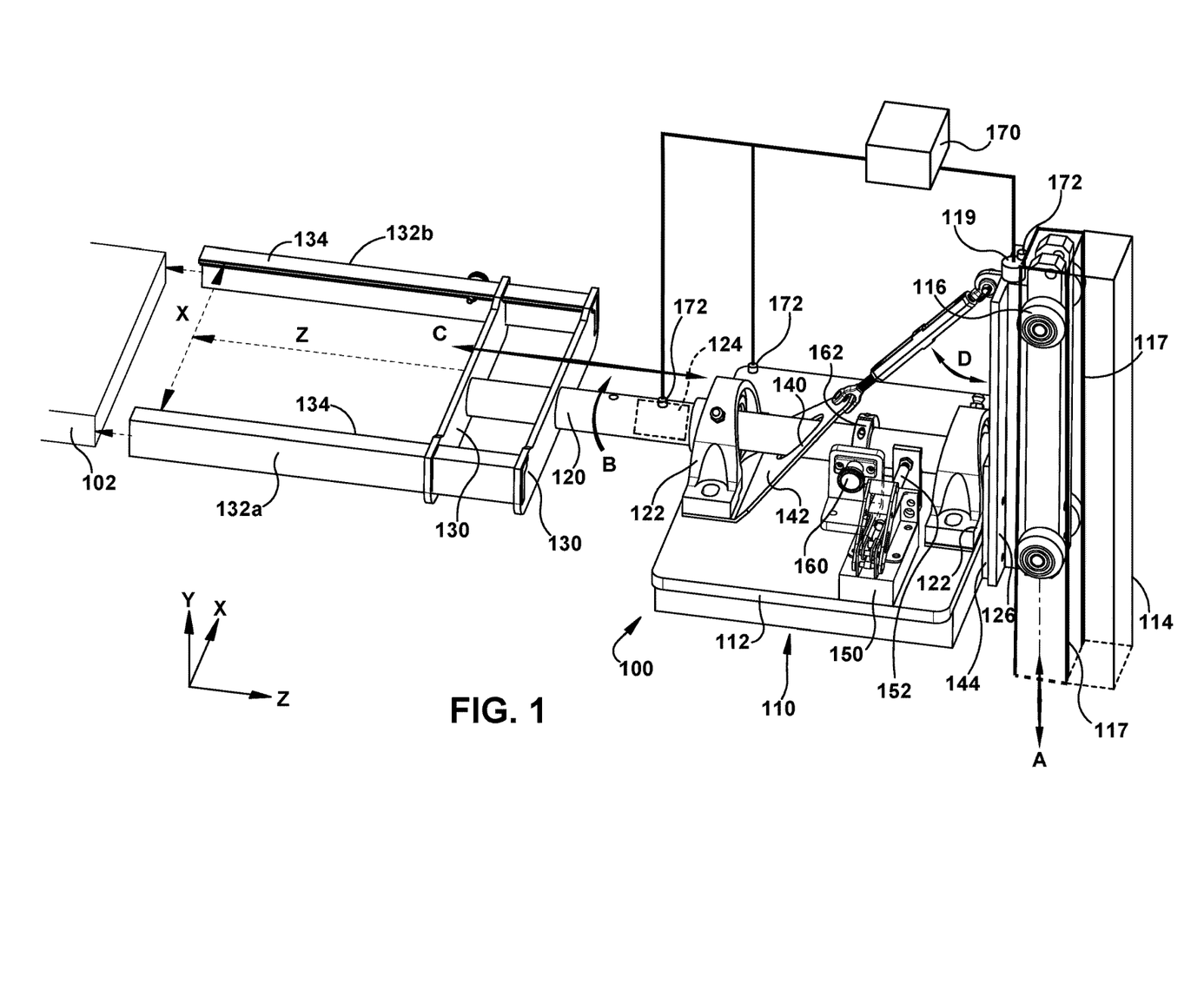
FIG. 1 provides a perspective view of an apparatus according to embodiments of the present disclosure.
Figure 2:
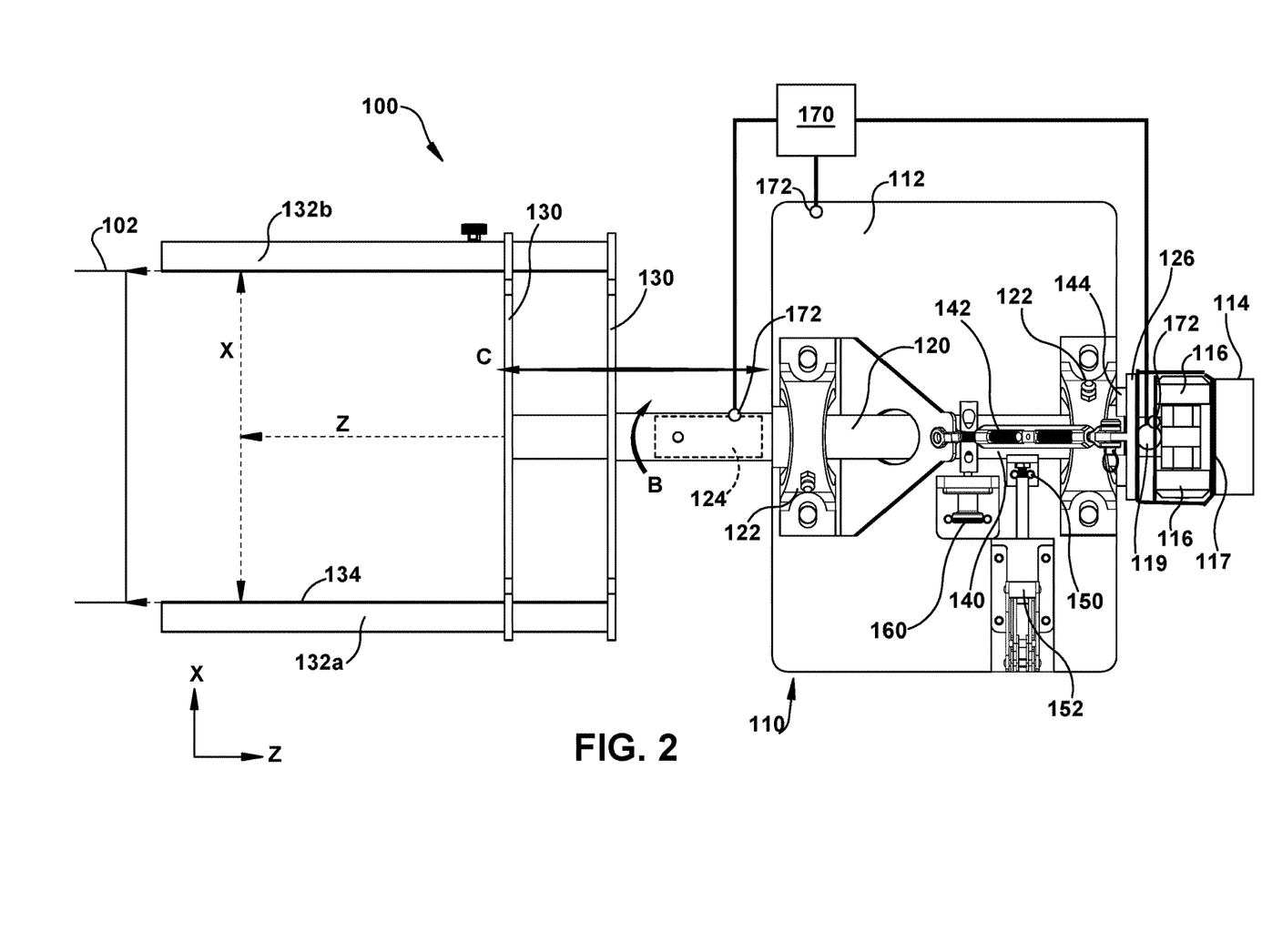
FIG. 2 provides a plan view of an apparatus according to embodiments of the present disclosure.
Figure 3:
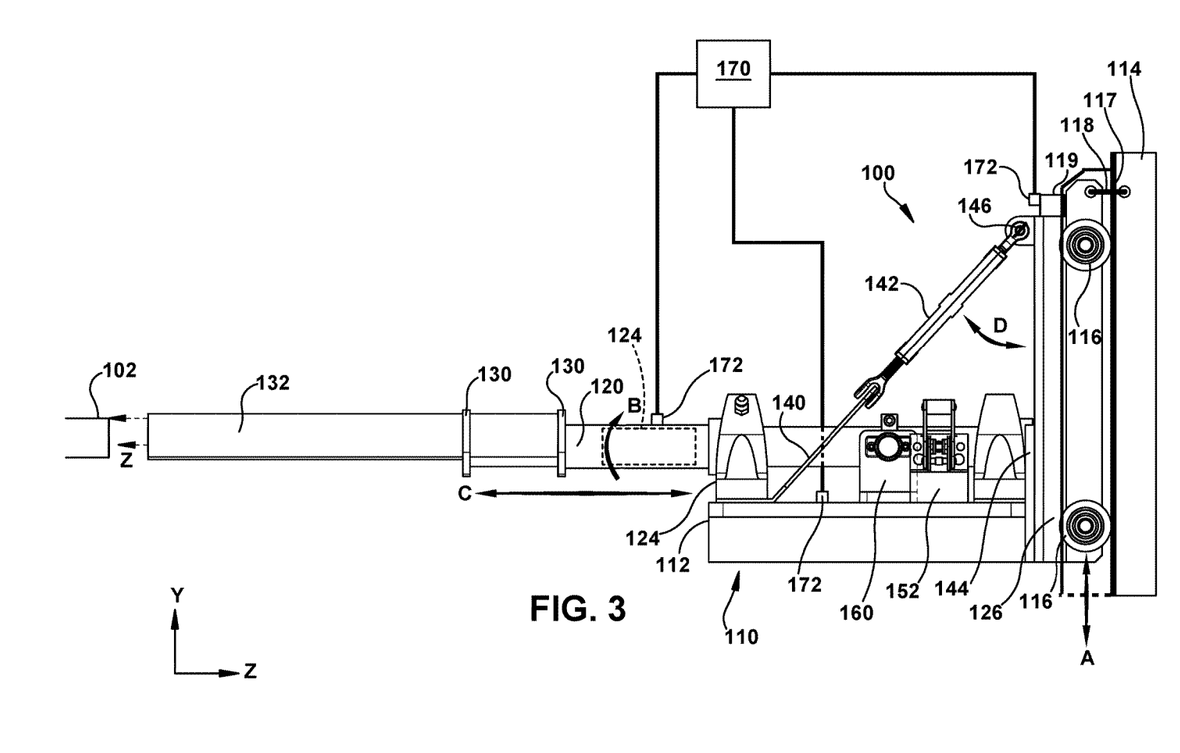
FIG. 3 provides a side view of an apparatus according to embodiments of the present disclosure.

Embodiments of the present disclosure include apparatuses and systems for rotatably engaging an additive manufacturing build plate ("build plate"), e.g., using a pair of coupling members mechanically coupled to a rotatable member. Referring to FIGS. 1-3 together, an apparatus 100 according to an embodiment of the disclosure is shown in perspective, plan, and side views, respectively. During operation, apparatus 100 can rotatably engage external components such as build plates 102 to provide functions such as lifting, loading, unloading, and moving between individual process stations. In particular, embodiments of apparatus 100 can rotatably engage build plate 102 to remove excess or unused raw materials (e.g., metal powder remaining after manufacturing on the build plate) therefrom before transporting build plate 102 and/or manufactured components thereon to another station. For example, apparatus 100 can be used in a manufacturing process which includes: manufacturing a component on build plate 102, substantially aligning apparatus 100 with build plate 102, rotatably engaging apparatus 100 to build plate 102, and moving, turning, and/or otherwise actuating build plate 102 with elements of apparatus 100 discussed herein. As used herein, the terms "substantial alignment" and "substantially aligned" can refer to any alignment by which movable components of apparatus 100 are actuated to move substantially along one axis (e.g., axis Z of FIGS. 1-3) to reach one or more structural features of build plate 102. Structural details of apparatus 100 are discussed herein to demonstrate the various engagement, positioning, and/or alignment functions relative to build plate 102 described herein.

Although apparatuses, systems, and methods of the present disclosure are described herein with reference to embodiments of build plate 102, it is understood that the present disclosure may also be applicable to other situations involving, for example, stages for manufacturing, modifying, and otherwise operating on pieces of equipment in one stage of a larger process. In FIGS. 1-3, an example set of axes (X, Y, and Z) are provided for the sake of clarity and demonstration. The Z axis also defines an axial direction in the following examples, with a "radial" direction being defined as a path extending outward from axis Z. Various types of movement relative to each axis X, Y, and Z are discussed to illustrate the various types of movement provided herein. However, it is further understood that embodiments of the present disclosure can include reorienting any given reference axis to thereby adapt to various situations and design concerns.

Several components of apparatus 100 can support and/or align other components configured to engage and manipulate build plate 102. Apparatus 100 is shown by example to include a height adjustable platform 110. Height adjustable platform 110, more specifically, can include a mount 112 slidably coupled to a post 114 such that mount 112 can be moved vertically relative to post 114 (i.e., along the direction of arrow A) to adjust the vertical position of height adjustable platform 110 and/or other components coupled to height adjustable platform 110. The slidable coupling between mount 112 and post 114 can be provided by way of one or more bearings 116, e.g., rolling bearings, bearing balls, sliding bearings, etc., for slidably engaging mount 112 to post 114 to permit vertical movement of mount 112, e.g., as indicated by arrow A. Mount 112 additionally or alternatively can be coupled to post 114 using any other form of slidable coupling discussed herein, in addition to others currently known or later developed. Regardless of the type of bearings 116 used, post 114 of height adjustable platform 110 can include one or more tracks 117 configured to engage bearings 116. Each track 117 can define a bearing surface, rolling or sliding surface, raceway, etc., for receiving bearings 116 to allow mount 112 to move relative to past 114. The engagement between bearings 116 and track 117 can allow a user of apparatus 100 to position height adjustable platform 110 at a desired height. In addition, one or more supports 118 (FIG. 3 only) can be used to selectively engage mount 112 to post 114 at a desired position. In an example embodiment, each support 118 can be embodied as a pin, clamp, rod, and/or other mechanical component for prohibiting movement between two components, e.g., by being positioned within and/or selectively affixed to the two components. As shown in FIG. 3, support(s) 118 can be embodied as a mechanical brace configured to engage post 114 and height adjustable platform 110 at fixed positions thereof, preventing movement of bearing(s) 116 along track 117. Supports 118 can allow a user to selectively maintain height adjustable platform 110 in a fixed position during the operation of apparatus 100 as discussed herein.

To move mount 112 relative to post 114, a drive mechanism 119 can be coupled (e.g., mechanically, pneumatically, hydraulically, or electrically) to height adjustable platform 110. Further, drive mechanism 119 can be coupled to mount 112 or post 114 or another component of apparatus 100.

Drive mechanism 119 can be embodied as, e.g., a linear actuator connected to mount 112 with a threaded drive rod, a handle-gear assembly, one or more motors, etc., for imparting mechanical energy to allow bearings 116 of mount 112 to move vertically in the direction of arrow A. In other embodiments, drive mechanism 119 can be a threaded rod, a piston, and/or a rail capable of moving substantially along bearings 116, e.g., along the direction of arrow A. Regardless of the embodiment used, drive mechanism 119 can impart power, mechanical force, etc., to allow mount 112 to vertically move relative to post 114.

A rotatable member 120 may be coupled to height adjustable platform 110, e.g., at the surface of mount 112, and is shown by example herein as being substantially in the form of a cylindrical member configured to rotate within coupling components 122 affixed to height adjustable platform 120. Rotatable member 120 may be configured to rotate about the defined radial axis (i.e., axis Z), e.g., in the direction indicated by arrow B in FIG. 1. Rotatable member 120 can be coupled to one or more components capable of imparting a rotation, e.g., a mechanically or electrically powered handle (not shown), motor (not shown), etc. Apparatus 100 can include an actuator 124, e.g., coupled to rotatable member 120 for extending and retracting rotatable member 120, e.g., in Z-axis along the direction of arrow C. Actuator 124 can be positioned proximal to and/or within any desired portion of rotatable member 120, and in an alternative embodiment can be provided as a portion of one coupling component 122.

Actuator 124 can be provided as any currently-known or later developed device for providing a variable length, volume, area, etc. For example, actuator 124 can be embodied as one or more of, e.g., a linear actuator, a piezoelectric actuator, a pneumatic actuator, a servo actuator, a nano actuator, a hydraulic actuator, a motor-driven actuator, and/or any other currently known or later-developed mechanism for adjusting a component length. Actuator 124 can mechanically join two portions of rotatable component 120 with different cross-sectional areas, such that rotatable member 120 can have a linearly variable length based on the movement and position of actuator 124. Although actuator 124 is described by example herein as being capable of, e.g., extending or retracting rotatable member 120 along the direction of arrow B, it is understood that different types of movement suited to a particular embodiment of actuator 124 can also be applicable and can yield the same effects. As such, the terms "extending," "retracting," etc., as applied to actuator 124 should not be given a limited interpretation.

Rotatable member 120 can be coupled to height adjustable platform 110 at one or more positions adapted for substantial alignment with build plate 102. For example, rotatable member 120 can be coupled to post 114 and/or a vertically-extending portion 126 of height adjustable platform 110 in a cantilevered manner. Mount 112 can extend in the direction of axis Z to support rotatable member 120 at or near its center of gravity. Height adjustable platform 110 can thereby orient rotatable member 120 in a predetermined direction such that other elements coupled to rotatable member 120 may be substantially aligned with build plate 102.

Apparatus 100 can include one or more alignment members 130 coupled to rotatable member 120 at a first end thereof. Each alignment member 130 can extend radially relative to the axial direction (i.e., substantially along the direction of X axis, perpendicular to and within the same plane of Z axis). To structurally support alignment members 130 and/or any components coupled thereto, a second axial end of rotatable component 120 can include a counterweight (not shown) thereon. For example, rotatable component 120 can have a greater concentration of mass at the axial end opposing alignment member(s) 130 and other components axially coupled to rotatable member 120. A pair of coupling members 132 can be coupled to alignment member(s) 130 at opposing ends. Each coupling member 132 can be identified individually as a first coupling member 132a and a second coupling member 132b, distinguished by their corresponding radial end of alignment member 130. To substantially align coupling members 132 with build plate 102, the radial span of alignment member 130 between coupling members 132 can be approximately equal to a corresponding radial span between opposing sidewalls of build plate 102. FIG. 3 illustrates a singular coupling member 132 which may be embodied as first and/or second coupling members 132a, 132b. Rotatable member 120, alignment member(s) 130, and coupling members 132 may be composed of a rigid material, e.g., a metal, plastic, composite material, etc., capable of engaging and supporting build plate 102. In addition, first and second coupling members 132a, 132b can extend axially (i.e., substantially along the direction of Z axis), substantially parallel with each other and rotatable member 120.

Each coupling member 132 can include one or more elements configured to engage build plate 102. For example, each coupling member can be shaped to include a radial protrusion 134 which extends radially inward (i.e., substantially along the direction of X axis) to contact a point of engagement located, e.g., on a sidewall build plate 102 as discussed elsewhere herein. For example, build plate 102 can include corresponding features (slots, grooves, tracks, etc.) for receiving radial protrusions 134 therein and/or other components of coupling members 132 shaped to engage build plate 102. Each radial protrusion 134 may be structurally continuous with the remainder of coupling member 132, such that no coupling points or elements between them are visible to an observer, or radial protrusions 134 can be manufactured as distinct components to be joined with coupling member(s) 132 in a separate process.

An angular adjuster 140 can be coupled between mount 112 and a substantially vertical reference surface (e.g., vertical portion 126 of height adjustable platform 110 where bearings 116 are positioned) to provide angular adjustment of rotatable member 120 and coupling member 132 relative to a reference plane (e.g., the X-Z plane). Angular adjuster 140 can be in the form of a tilting mechanical connection such as, for example, an industrial hinge or mechanically adjustable incline capable of moving in the direction of arrow D. If desired, angular adjuster 140 may be powered by an extension element 142, e.g., an actuator, a spring, a geared screw adjustment, and/or other adjustable mechanical elements driven by a power supply such as drive mechanism 119 and/or another component such as an electric, hydraulic, or pneumatic motor. The position of mount 112, coupled to angular adjuster 140 at one end, can allow the orientation of rotatable member 120 and coupling members 132 to be adjustably moved to several angular positions, thereby allowing apparatus 100 to engage build plates 102 in a variety of settings. Height adjustable platform 110 can be configured to accommodate the movement of angular adjuster 140, e.g., by including a pivot coupling 144 therein. Pivot coupling 144 can rotatably join mount 112 to vertical portion 126 of height adjustable platform 110, thereby permitting rotatable member 120, coupling members 132, etc., to have varying angular orientations as angular adjuster 140 moves in the direction of arrow D. In addition, angular adjuster 140 can be coupled directly to vertical portion 126 of height adjustable platform 110 through a hinge 146. Hinge 146 can allow vertical portion 126 of height adjustable platform 110 to remain in a fixed position as angular adjuster 140 manipulates the angle of mount 112 relative to vertical portion 126, e.g., by moving in the direction of arrow D.

Apparatus 100 can include mechanisms for restraining and/or further controlling the various forms of movement described herein, including components for restraining or controlling movement along the direction of arrows A, B, C, D. For example, a user may desire to decelerate the rotation or linear movement of rotatable member 120 and coupling members 132 along the direction of arrows B, C to provide more accurate alignment between coupling members 132 and the sidewalls of build plate 102. A brake assembly 150 can be positioned on height adjustable platform 110 (e.g., on an upper surface of mount 112) proximal to rotatable member 120, such that brake assembly 150 is operable to inhibit rotational and/or linear movement of rotatable member 120. Brake assembly 150 can include a brake pad 152 which can be actuated, e.g., by a rod, piston, lever, and/or other mechanical instrument for causing brake pad 152 to selectively contact the circumference of rotatable member 120 as it rotates. Brake pad 152 can be composed of an abrasive material or other substance for imparting a frictional force opposing the movement of rotatable member 102. Without limitation, brake pad 152 can include, e.g., metallic materials, ceramic materials, semi-metallic materials, etc. Brake assembly 150 can thereby allow a user of apparatus 100 to slow or prevent movement of rotatable member 120 as it approaches a desired alignment. A user can manually control brake assembly 150 to place brake pad 152 in contact with rotatable member 120, or a controller 170 coupled to brake assembly 150 can selectively engage or disengage brake pad 152 as discussed elsewhere herein.

A user of apparatus 100 may desire for rotatable member 120 and coupling members 132 to remain stationary, in a fixed position, after being substantially aligned with build plate 102. To prevent rotation of rotatable member 120 after substantially aligning coupling members 132 with build plate 102, apparatus 100 can include a lock 160 coupled to height adjustable platform 110 proximal to rotatable member 120. Lock 160 can be provided in the form of any currently known or later-developed mechanical instrument for selectively prohibiting rotational movement. In an example embodiment, lock 160 can be embodied as a rigid pin for engaging a recess 162 positioned, e.g., directly within rotatable member 120 or on a ring mounted circumferentially on rotatable member 120. The engagement between lock 160 and recess 162 can prevent rotatable member 120 from moving in the direction of arrows A and B, until a user disengages lock 160 from recess 162. It is understood that lock 160 can include other mechanisms for selectively permitting or prohibiting movement of rotatable member 120.

Apparatus 100 can include and/or interact with controller 170 for governing the operation of moving components thereof. Controller 170 can adjust a height of height adjustable platform 110 and/or a rotational position of rotatable member 120. In particular, controller 170 can be communicatively coupled to drive mechanism 119, actuator 124, and/or other components for adjusting apparatus 100 as described herein. Controller 170 may be communicatively connected to drive mechanism 119, actuator 124, and/or other elements such as brake assembly 150 or lock 160. These connections between controller 170 and components of apparatus 100 can allow controller 170 to perform various actions for automating apparatus 100 to provide mechanical adjustments discussed herein. For example, controller 170 can actuate drive mechanism 119 and/or actuator 124 to substantially align apparatus 100 with build plate 102 as described herein. Controller 170 may actuate drive mechanism 119 and/or actuator 124 in response to inputs provided manually by a user and/or automatically by other systems, computing devices, etc. Controller 170 may be a computerized, mechanical, or electro-mechanical device capable of manipulating adjustable components and mechanisms coupled thereto (e.g., drive mechanism 119 and/or actuator 124).

In one embodiment, controller 170 may be a computerized device capable of providing operating instructions to drive mechanism 119 and/or actuator 124. In this case, a group of sensors 172 may monitor the position of build plate 102 and elements of apparatus 100 by directly or indirectly monitoring positions, operating speeds, orientations, etc., to provide operating instructions to drive mechanism 119 and/or actuator 124. Controller 170 may send operating instructions to actuator 124 under certain operating conditions (e.g., to rotate or extend rotatable component 120). Drive mechanism 119 and/or actuator 124 may include electro-mechanical components capable of receiving operating instructions (electrical signals) from controller 170 and producing mechanical motion (e.g., moving mount 112 relative to post 114. Sensors 172 can be provided at various positions of apparatus 100 to measure and/or determine various properties of apparatus 100 during operation. Each sensor 172 can be communicatively connected to controller 170 such that controller 170 can manipulate drive mechanism 119, actuator 124, and/or other components of apparatus 100 to yield a desired adjustment. In an example embodiment, sensor(s) 172 can be coupled to and/or included within drive mechanism 119, actuator 124, and/or can be positioned on moving components of apparatus 100 (e.g., height adjustable platform 110) to sense properties such as position, speed, displacement from an initial position, etc. Thus, each sensor 172 can be embodied as a positional sensor including without limitation a proximity sensor, a potentiometer, an optical sensor, an inductive non-contact position sensor, a linear encoder, and/or any other type of sensor operable to detect the position of one or more components. Although three sensors 172 are shown in FIGS. 1-3, it is understood that one or more sensors 172 can be omitted and/or added to apparatus 100 to detect the position of any movable component thereof.

Controller 170 may include a mechanical device configured for use by an operator. In this case, the operator may physically manipulate controller 170 (e.g., by pulling a lever), which may actuate drive mechanism 119 and/or actuator 124. For example, the lever of controller 170 may be mechanically linked to drive mechanism 119, actuator 124, and/or other components described herein such that pulling the lever causes drive mechanism 119 and/or actuator 124 to move between one or more selectable positions and/or operating states. In another embodiment, controller 170 may be an electro-mechanical device, capable of electrically monitoring (e.g., with sensors) parameters yielded from sensor(s) 172 which indicate the position of apparatus 100, components thereof, the current status of drive mechanism 119 and/or actuator 124, etc. While described in several embodiments herein, controller 170 may actuate drive mechanism 119, actuator 124, and/or other adjustable components through any other conventional means.

Controller 170 can comprise any general purpose computing article of manufacture for executing computer program code installed by a user (e.g., a personal computer, server, handheld device, etc.). To this extent, in other embodiments, controller 170 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, controller 170 may include a program product stored on a computer readable storage device, which can be operative to automatically control apparatus 100 (e.g., through drive mechanism 119 and/or actuator 124) when executed.

In an embodiment, controller 170 can include or be embodied as a program product stored on a computer readable storage medium, operative to engage apparatus 100 with build plate 102 when executed. In particular, the program product can include program code for causing actuator 124 and/or other components of apparatus 100 to rotate rotatable member 120 and coupling members 132 of apparatus 100, such that coupling members 132 are substantially aligned with opposing sidewalls of build plate 102. In some cases, controller 170 may include program code which defines a plurality of angular positions (e.g., relative to reference axis Z) for coupling members 132, and selecting one of the plurality of angular positions before causing coupling members 132 to rotate. To provide a more accurate alignment with build plate 102, controller 170 may be configured to actuate drive mechanism 119 to adjust a height of height adjustable platform 110, before rotating coupling members 132. In addition or alternatively, controller 170 can include program code for adjusting an angular orientation of height adjustable platform 110 by manipulating drive mechanism 119 to adjust angular adjuster 140 and/or extension element 142. Controller 170 can also instruct actuator 124 to linearly actuate coupling members 132 (i.e., move in the direction of arrow C) to engage the opposing sidewalls of build plate 102. After engaging build plate 102 with apparatus 100, controller 170 can manipulate actuator 124 to adjust a position of build plate 102 by further controlling actuator 124 and/or drive mechanism 119 to adjust coupling members 132.

Figure 4:
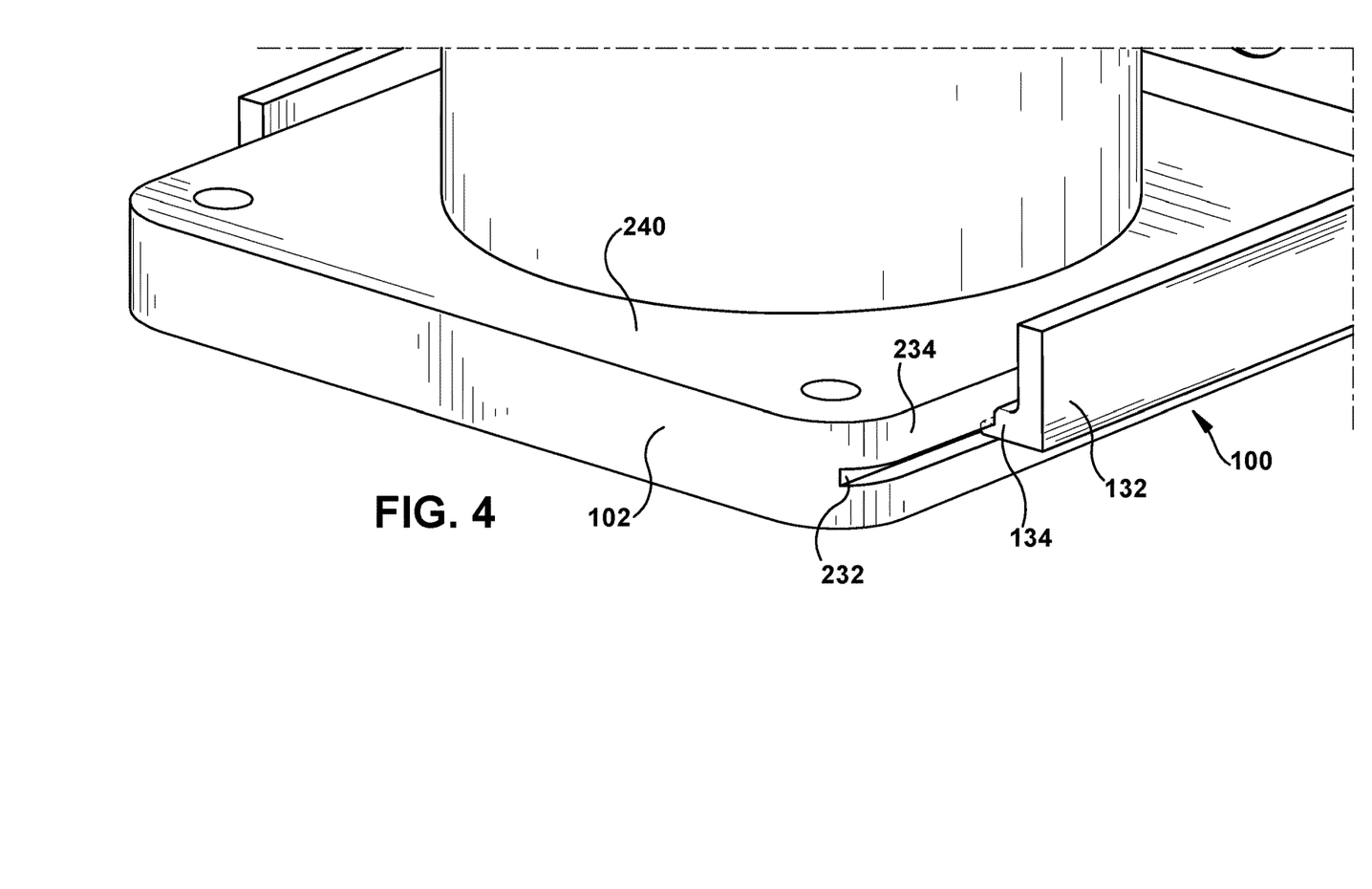
FIG. 4 provides a perspective view of an apparatus rotatably engaging a build plate according to embodiments of the present disclosure.
Figure 5:
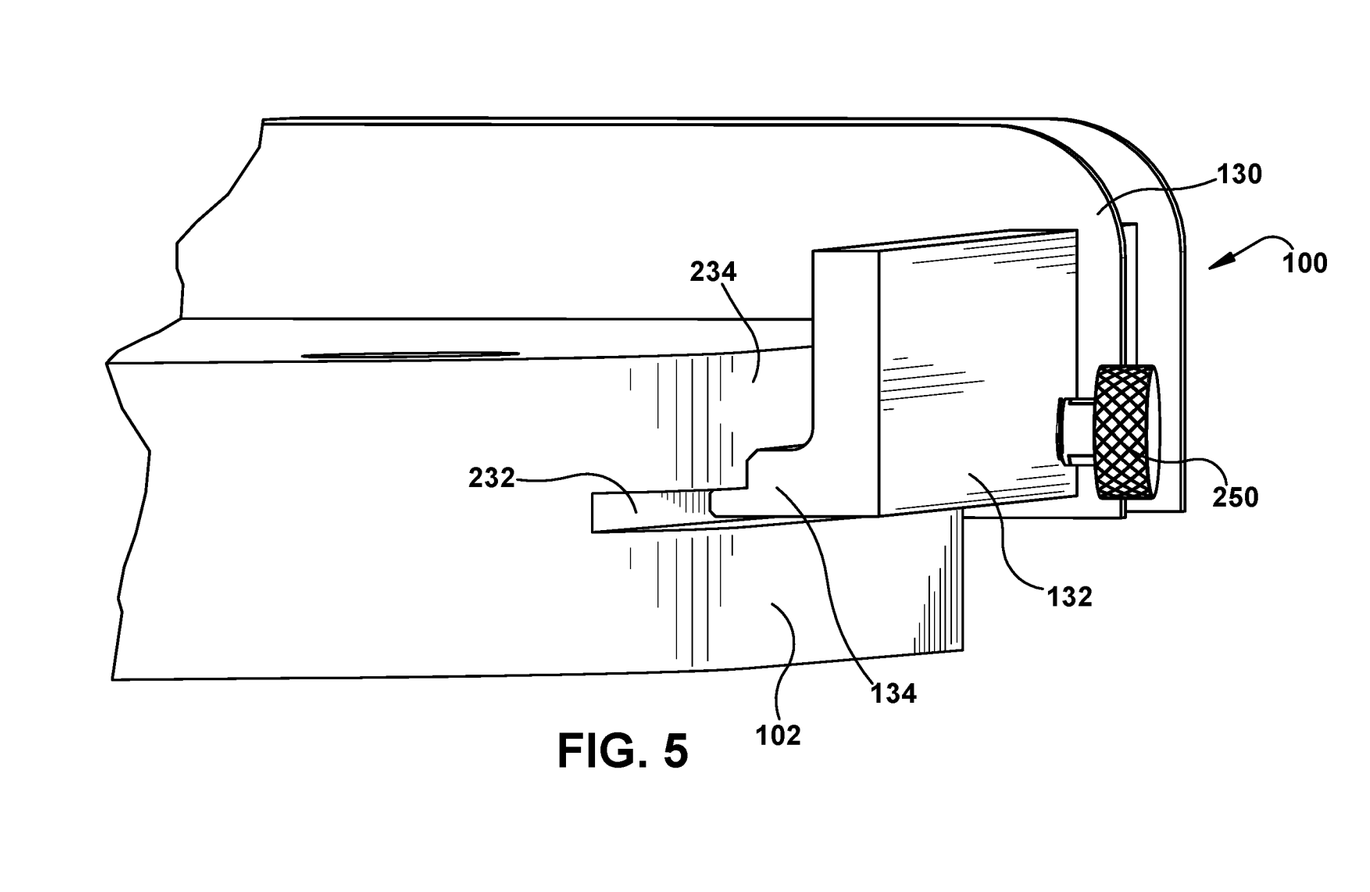
FIG. 5 provides a perspective view of an apparatus rotatably engaging and clamped to a build plate according to embodiments of the present disclosure.

Turning to FIGS. 4-5, an embodiment of apparatus 100 mechanically engaging build plate 102 is shown. Coupling members 132 can be substantially aligned with respective slots 232, each embedded in a sidewall 234 of build plate 102. In some cases, controller 170 (FIGS. 1-3) may be configured to substantially align coupling members 132 and/or radial protrusions 134 with slots 232 before actuating rotatable member 120 and/or coupling members 132 to engage build plate 102. Where applicable, height adjustable platform 110 can be moved to a desired height and/or angle (e.g., using bearings 116 (FIGS. 1-3) angular adjuster 140 (FIGS. 1-3)) before engaging coupling members 132 with build plate 102. Rotatable member 120 can be moved (e.g., using actuator 124) to slidably engage coupling members 132 in slots 232. Apparatus 100 can then manipulate build plate 102 with coupling members 132 engaged thereto to provide one or more functions. For example, where excess waste material is present on an upper surface 240 of build plate 102, rotatable member 120 can rotate build plate 102 via coupling members 132 to remove the waste material. Rotating build plate 102 with apparatus 100 engaged therein can provide other technical benefits, e.g., moving supports, anchors, and/or other manufacturing vestiges into positions where they can be removed more easily. Where apparatus 100 is provided as a portion of a movable assembly such as a cart, apparatus 100 can transport build plate 102 to another site after engaging build plate 102 with coupling members 132, e.g., using radial protrusions 134.

As shown in FIG. 5, further elements of apparatus 100 can improve the engagement between coupling members 132 and slots 232 of build plate 102. For example, coupling members 132 can each include a clamp 250. To maintain build plate 102 in a fixed position with coupling members 132, each clamp 250 can extend radially through coupling member 132 toward sidewall(s) 234 of build plate 102. In addition, build plate 102 can also include a recess, threaded fastener, etc., for receiving clamp 250 therein and further prohibit movement of build plate 102 relative to apparatus 100. To mechanically coupled build plate 102 to apparatus 100 in a desired position, clamp 250 can be selectable between a clamped position and an unclamped position as discussed herein, e.g., by way of components shown in FIGS. 6 and 7 and discussed elsewhere herein. Clamp 250 can alternatively be embodied as one or more other mechanical coupling components (e.g., pneumatic locks, pins, rivets, bolts, etc.) for selectively inhibiting axial movement of coupling members 132 relative to build plate 102.

Figure 6:
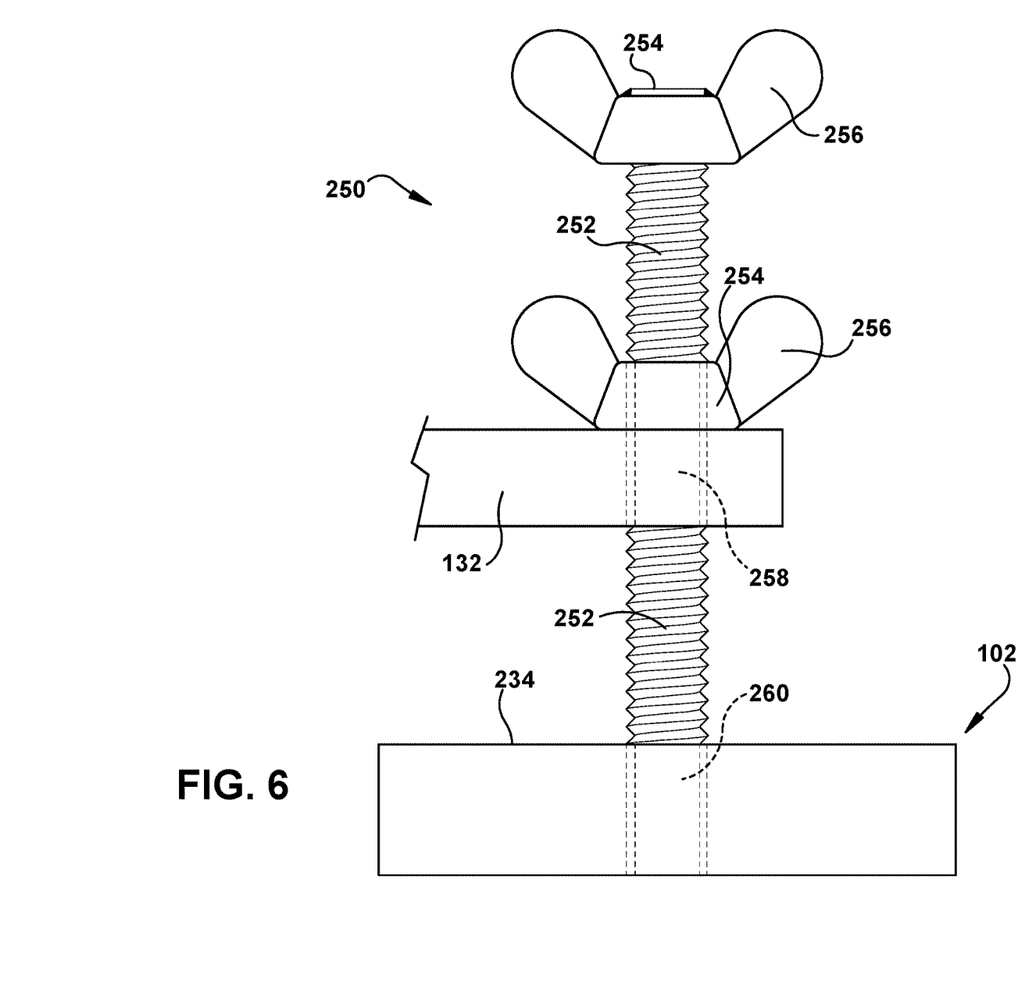
FIG. 6 provides a side view of a clamp used with a coupling member according to embodiments of the present disclosure.

Referring to FIG. 6, an embodiment of clamp 250 for maintaining coupling members 132 in a fixed position relative to sidewall(s) 234 of build plate 102 is shown. Clamp 250 can include a fastener 252 embodied as, e.g., a bolt, a screw, a rivet, etc., which may include threading on an outer surface thereon. To provide mechanical engagement between fastened bodies (e.g., coupling member 132 and sidewall 234 of build plate 102), fastener 252 can include one or more nuts 254 which may be mounted circumferentially on fastener 252. Each nut 254 can include, e.g., a pair of wings 256 for imparting torque to nut(s) 254, thereby allowing nut 254 to move along a threaded surface of fastener 252. In some cases, nut 254 and wings 256 can be embodied as a unitary wing nut, jam nut, or similar component configured for use with fastener 252. For example, two nuts 254 can be moved with and/or relative to fastener 252 to contact each other to press coupling member 132 against sidewall 234 of build plate 102. In alternative embodiments, nut(s) 254 and wings 256 can be substituted for other mechanical devices for fastening one component to another. Fastener 252 can extend through an aperture 258 of coupling member 234 in addition to a recess 260 within sidewall 234 of build plate 102. Where fastener 252 includes threading on its circumferential surface, aperture 258 and recess 260 can each include a threaded interior surface, e.g., to prevent non-rotational movement of fastener 252. Clamp 250, as shown in FIG. 6, can mechanically connect coupling member(s) 132 to build plate 102 at its sidewall 234, such that apparatus 100 (FIGS. 1-3) can hold and/or move build plate 102 during operation.

Figure 7:
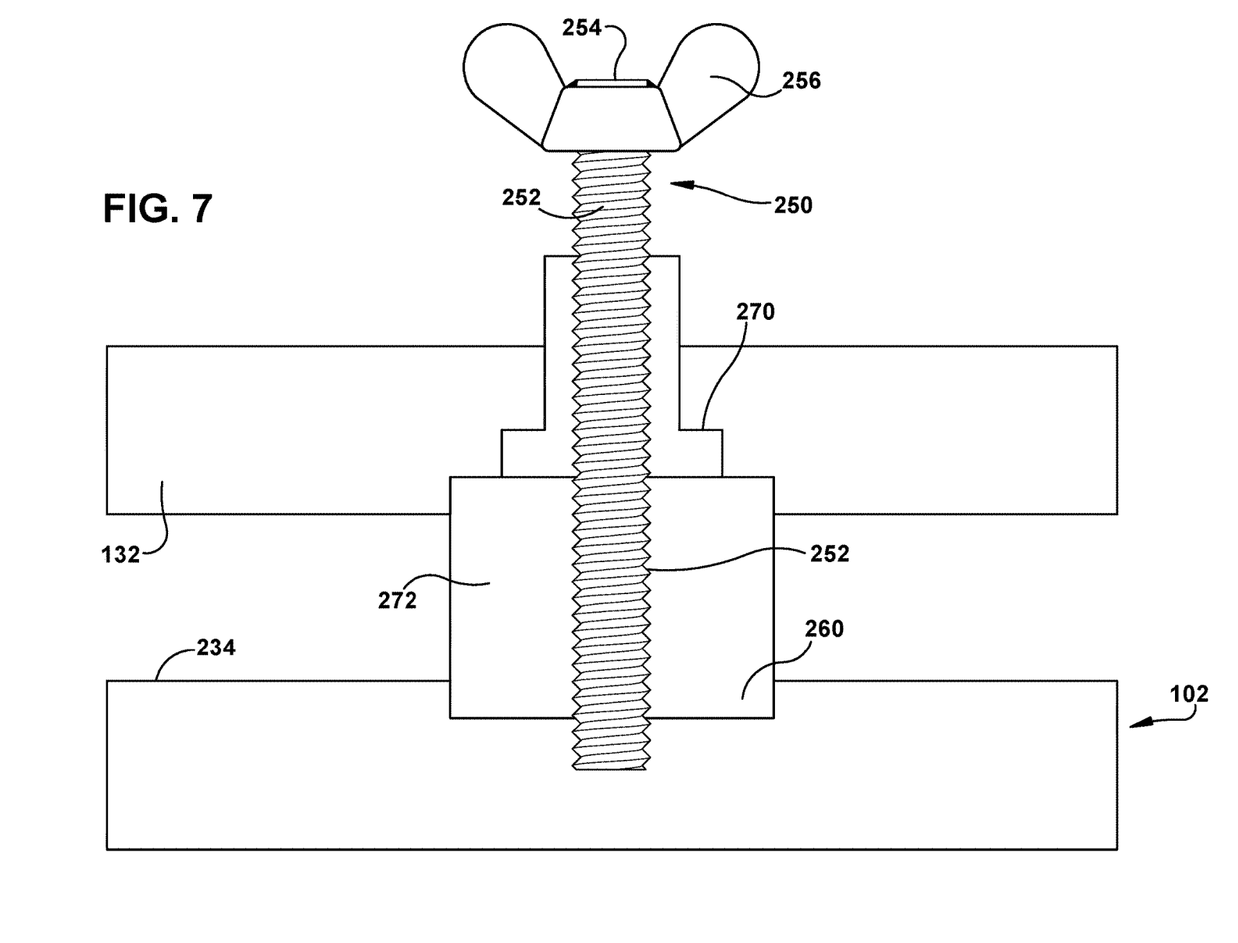
FIG. 7 provides a side view of an alternative clamp for a coupling member and a build plate according to embodiments of the present disclosure.

Turning to FIG. 7, an alternative embodiment of clamp 250 for coupling member 132 and build plate 102 is shown. Rather than being coupled directly to sidewall 234 of build plate 102 (e.g., through recess 260), fastener 252 of clamp 250 can be engaged to a clamping body 270 configured to receive fastener 252 therein. Clamping body 270, furthermore, can be positioned within coupling member 132 (e.g., by extending through aperture 258 (FIG. 6)). Clamping body 270 can be mechanically coupled to a riser block 272 shaped to engage recess 260 of build plate 102, thereby providing lateral separation between coupling member 132 and sidewall 234 of build plate 102. Fastener 252 can extend through clamping body 270 and riser block 272 to engage recess 260 of build plate 102. Although an embodiment of clamp 250 which includes clamping body 270 and riser block 272 is shown in FIG. 7, it is understood that alternative forms of clamp 250 (including, e.g., other clamping mechanisms and/or elements of clamp 250 depicted in FIG. 6) can be substituted and/or combined with those discussed herein to mechanically couple build plate 102 with coupling member(s) 132 during operation.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A plate manipulation apparatus comprising:
   a height adjustable platform, wherein the height adjustable platform includes a mount slidably coupled to a post through a bearing, the mount being height adjustable relative to a bearing surface of the post;
   a rotatable shaft coupled to the mount of the height adjustable platform and defining an axial direction from the height adjustable platform;
   a rotational bearing positioned on the mount of the height adjustable platform, wherein the rotatable shaft passes through the rotational bearing;
   an angular adjuster having an extension element therein, the angular adjuster including a first end pivotally connected to the post and a second end coupled to the rotational bearing, wherein the extension element adjusts a pitch of the mount and the rotatable shaft relative to the post;
   an alignment bar coupled to an axial end of the rotatable shaft and oriented radially relative to the axial direction, wherein the alignment bar includes a first radial end and an opposing second radial end;
   a first coupling arm extending in the axial direction from the first radial end of the alignment bar and configured to mechanically engage a first sidewall of a plate, wherein the first coupling arm is oriented substantially parallel to the rotatable shaft;
   a second coupling arm extending in the axial direction from the second end of the alignment bar and configured to mechanically engage a second sidewall of the plate, the second sidewall being radially opposed to the first sidewall, wherein the second coupling arm is oriented substantially parallel to the rotatable shaft;
   wherein the rotatable shaft is coupled to the mount of the height adjustable platform;
   wherein the angular adjuster includes an aperture therein, and wherein the rotatable shaft passes through the aperture of the angular adjuster.

2. The plate manipulation apparatus of claim 1, wherein each of the first and second coupling arms further includes a radial protrusion shaped to matingly engage a respective slot within one of the first and second sidewalls of the plate.

3. The plate manipulation apparatus of claim 1, further comprising a clamp coupled to one of the first and second coupling arms, wherein the clamp is configured to inhibit axial movement of the plate relative to the rotatable shaft.

4. The plate manipulation apparatus of claim 1, further comprising a controller coupled to the height adjustable platform and the rotatable shaft, wherein the controller is configured to adjust a height of the height adjustable platform and a rotational position of the rotatable shaft.

5. The plate manipulation apparatus of claim 1, further comprising a lock coupled to the height adjustable platform proximal to the rotatable shaft, the lock being configured to selectively engage the rotatable shaft in one of a plurality of rotational positions.

6. The plate manipulation apparatus of claim 1, further comprising a brake coupled to the height adjustable platform and configured to selectively contact a rotatable surface of the rotatable shaft.

7. The plate manipulation apparatus of claim 1, wherein the angular adjuster further includes a hinge coupled between the rotational bearing and the extension element.

8. A plate manipulation apparatus comprising:
   a height adjustable platform, wherein the height adjustable platform includes a mount slidably coupled to a post through a bearing, the mount being height adjustable relative to a bearing surface of the post;
   a rotatable shaft including an actuator therein, and mechanically coupled to the mount of the height adjustable platform, wherein the rotatable shaft defines an axial direction;
   a rotational bearing positioned on the mount of the height adjustable platform, wherein the rotatable shaft passes through the rotational bearing;
   an angular adjuster having an extension element therein, the angular adjuster including a first end pivotally connected to the post and a second end coupled to the rotational bearing, wherein the extension element adjusts a pitch of the mount and the rotatable shaft relative to the post;
   an alignment bar coupled to an axial end of the rotatable shaft, wherein the alignment bar extends substantially radially relative to the rotatable shaft; and
   a pair of coupling arms coupled to the alignment bar at opposing radial ends thereof, wherein each of the pair of coupling arms extends axially and substantially parallel with the rotatable shaft;
   a controller operatively connected to the rotatable shaft and configured to rotatably engage the pair of coupling arms with a build plate by performing actions including:
      adjusting the extension element of the angular adjuster to adjust the pitch of the mount relative to the post,
      rotating the pair of coupling arms to be substantially aligned with a respective pair of opposing sidewalls of the build plate,
      linearly actuating the pair of coupling arms to engage the pair of opposing sidewalls of the build plate, and adjusting a position of the build plate with the pair of coupling arms engaged in the pair of opposing sidewalls thereof;

wherein the rotatable shaft is coupled to the mount of the height adjustable platform;

wherein the angular adjuster includes an aperture therein, and wherein the rotatable shaft passes through the aperture of the angular adjuster.

9. The plate manipulation apparatus of claim 8, wherein the controller is further configured to rotate the pair of coupling arms to a selected angular orientation relative to a vertical reference axis.

10. The plate manipulation apparatus of claim 8, wherein the controller is further configured to adjust a height of the height adjustable platform, before rotating the pair of coupling arms.

11. The plate manipulation apparatus of claim 8, wherein the controller is further configured to substantially align the pair of coupling arms with a pair of slots each formed within one of the opposing sidewalls of the build plate.

12. The plate manipulation apparatus of claim 8, wherein the angular adjuster further includes a hinge coupled between the rotational bearing and the extension element.

13. A plate manipulation system comprising:

a height adjustable platform, wherein the height adjustable platform includes a mount slidably coupled to a post through a bearing, the mount being height adjustable relative to a bearing surface of the post;

a rotatable shaft coupled to the mount of the height adjustable platform and defining an axial direction from the height adjustable platform, the rotatable shaft including an actuator therein;

a rotational bearing positioned on the mount of the height adjustable platform, wherein the rotatable shaft passes through the rotational bearing;

an angular adjuster having an extension element therein, the angular adjuster including a first end pivotally connected to the post and a second end coupled to the rotational bearing, wherein the extension element adjusts a pitch of the mount and the rotatable shaft relative to the post;

an alignment bar coupled to an axial end of the rotatable shaft and oriented radially relative to the axial direction, wherein the alignment bar includes a first radial end and an opposing second radial end;

a first coupling arm extending axially from the first radial end of the alignment bar and configured to mechanically engage a first sidewall of a build plate, wherein the first coupling arm is oriented substantially parallel to the rotatable shaft;

a second coupling arm extending axially from the second radial end of the alignment bar and configured to mechanically engage a second sidewall of the build plate, the second sidewall being radially opposed to the first sidewall, wherein the second coupling arm is oriented substantially parallel to the rotatable shaft; and a controller communicatively coupled to the actuator of the rotatable shaft, wherein the controller is configured to perform actions including:

adjusting the extension element of the angular adjuster to adjust the pitch of the mount relative to the post;

rotating the rotatable shaft to be substantially aligned with a respective pair of opposing sidewalls of the build plate;

linearly actuating the rotatable shaft such that the first and second coupling arms engage the first and second sidewalls of the build plate; and rotating the rotatable shaft to move the build plate with the first and second coupling arms engaged in the first and second sidewalls thereof;

wherein the rotatable shaft is coupled to the mount of the height adjustable platform;

wherein the angular adjuster includes an aperture therein, and wherein the rotatable shaft passes through the aperture of the angular adjuster.

14. The plate manipulation system of claim 13, wherein the angular adjuster further includes a hinge coupled between the rotational bearing and the extension element.

* * * * *